United States Patent [19]

Weber et al.

[11] Patent Number: 5,087,020

[45] Date of Patent: Feb. 11, 1992

[54] CUSHION BEARING FOR MOTOR VEHICLES

[75] Inventors: Otto Weber; Volkmar Keck, both of Wolfsburg; Siegfried Grohnert, Cremlingen; Manfred Thesenvitz, Braunschweig, all of Fed. Rep. of Germany

[73] Assignee: Volkswagen AG, Wolfsburg, Fed. Rep. of Germany

[21] Appl. No.: 614,274

[22] Filed: Nov. 16, 1990

[30] Foreign Application Priority Data

Nov. 16, 1989 [DE] Fed. Rep. of Germany ....... 3938048

[51] Int. Cl.⁵ ............................................... B60G 11/62
[52] U.S. Cl. .............................. 267/35; 267/140.1 A; 267/64.17; 267/64.19
[58] Field of Search ................ 267/64.11, 64.17, 64.19, 267/64.21, 64.27, 122, 123, 35, 64.15, 113, 121, 140.1 A, 140.1 R, 219, 220; 188/298; 180/300, 312; 246/562, 636; 92/84

[56] References Cited

U.S. PATENT DOCUMENTS 1,579,183  1/1924  Weiland .......................... 188/298 X
4,392,639  7/1983  Konishi .......................... 267/140.1
4,407,491  10/1983  Kunihiro et al. ............... 267/140.1
4,514,942  5/1985  Pocanschi ...................... 248/636 X

FOREIGN PATENT DOCUMENTS 3505632  9/1985  Fed. Rep. of Germany.
3742340  7/1988  Fed. Rep. of Germany ...... 180/312
811748   5/1957  United Kingdom ................ 267/35

Primary Examiner—Robert J. Oberleitner
Assistant Examiner—Lee W. Young
Attorney, Agent, or Firm—Brumbaugh, Graves, Donohue & Raymond

[57] ABSTRACT

In the embodiment described in the specification, a cushion bearing for motor vehicles has two rigid bearing seats with a resilient rubber bearing block and an air spring acting between the seats. The air spring has a bellows forming a chamber divided into two compartments by a throttling plate which is connected to one of the bearing seats by way of a central rod and a rigid housing connected to the other bearing seat encloses the bellows. The bellows has at least one intake valve so that the air spring is automatically pumped up during relative motion between the bearing seats.

5 Claims, 1 Drawing Sheet

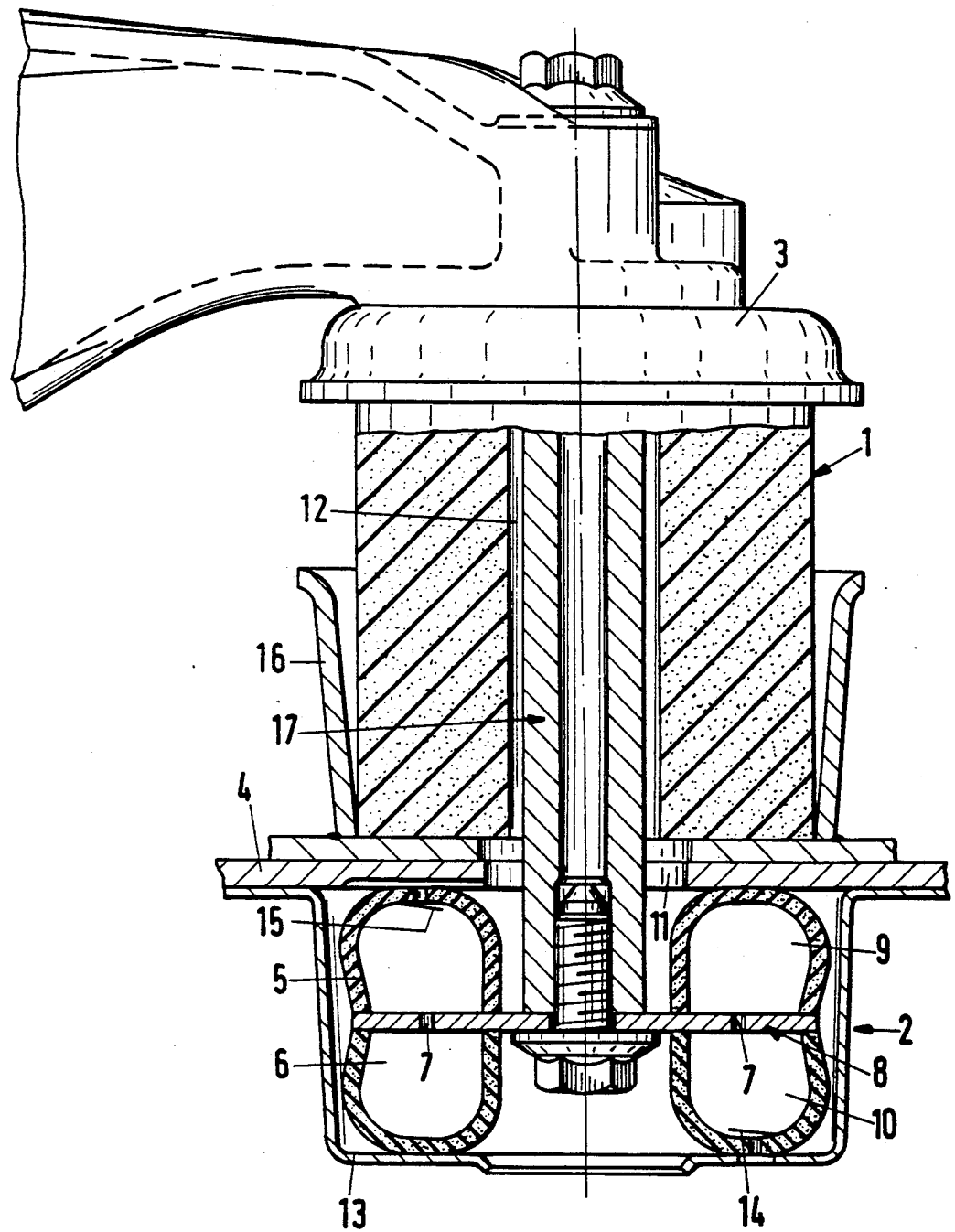

CUSHION BEARING FOR MOTOR VEHICLES

BACKGROUND OF THE INVENTION

This invention relates to a cushion bearing of the type used in motor vehicles combining a bearing block of resilient material and a gas spring.

German Offenlegungsschrift No. 3,505,632 discloses a cushion bearing combining a resilient rubber bearing block and a double-acting gas spring, i.e., one acting in either of the two possible directions of opposite relative movement between two opposed bearing seats. That combination provides highly desirable properties in that it will both suppress propagation of small-amplitude high-frequency vibrations such as engine noise and absorb higher-amplitude low-frequency vibrations such as motions resulting from alternating load impacts. In other words, such a combination bearing is very soft for small-amplitude motions at high frequency, yet hard for large-amplitude motions at low frequency.

More specifically, the above-mentioned conventional bearing design includes a bellows made of resilient material forming a gas chamber and a hollow spherical throttling member which is connected to one of the bearing seats and divides the gas chamber bellows into two compartments. The bellows is fixed to the other bearing seat and has a metal insert in the region of the sliding surface of the throttling member. In the region of one of the compartments, the bellows, which is pneumatically sealed from the atmosphere, has a connection for an external gas supply which allows for the possibility of providing various spring constants by means of different pressures in the gas chamber. Since the bellows is suspended from the other bearing seat, it must assume the full force transmitted by the throttling member. Consequently, even if a gas supply for varying the spring constant is omitted, a continuous supply of gas is required since there is danger that the bellows, being subjected to high mechanical stresses, may not retain the required pneumatic seal, at least over long periods of time.

SUMMARY OF THE INVENTION

Accordingly, it is an object of the present invention to provide a cushion bearing which overcomes the above-mentioned disadvantages of the prior art.

Another object of the invention is to provide a cushion bearing having a gas chamber which does not require any external gas supply even for operation over extended periods of time.

These and other objects of the invention are attained by providing a cushion bearing with a bellows forming a gas chamber disposed between bearing seats, the bellows having an internal throttling member connected to one bearing seat and dividing the gas chamber into two compartments, and also having at least one intake valve to permit ambient air to be drawn into the chamber during relative movement of the bearing seats.

Thus, in contradistinction to the above-mentioned prior art arrangement, the air spring in the bearing according to the invention constitutes an open system in which an intake valve will inflate the air spring with ambient air during movements of the throttling member caused by relative motions between the bearing seats. By confining the bellows forming the gas chamber in a rigid housing which is connected to the other bearing seat, a double action of the air spring is insured by a simple arrangement without undue mechanical stress being imposed on the bellows material.

BRIEF DESCRIPTION OF THE DRAWING

Further objects and advantages of the invention will be apparent from a reading of the following description in conjunction with the accompanying drawing, which is an axial sectional view illustrating a representative cushion bearing arranged in accordance with the invention.

DESCRIPTION OF PREFERRED EMBODIMENT

In the typical embodiment of the invention shown in the drawing, a resilient bearing block 1, made of rubber-like material, and an air spring 2 are arranged to act in parallel with respect to two rigid bearing seats 3 and 4. In the case of a dual bearing in a motor vehicle, the bearing seat 3 is attached to a mount supporting a matching bearing, while the seat 4 is connected to the chassis of the vehicle.

As illustrated in the sectional view shown in the drawing, the air spring 2 includes a toroidal bellows 5 enclosing an air chamber 6 which is divided into two compartments 9 and 10 by a throttling plate 8 having throttle apertures 7. Thus, the compartments 9 and 10 are in restricted flow communication through the throttle apertures 7. The throttling plate 8 is connected to the bearing seat 3 by a rod 17 which extends through an aperture 11 in the other bearing seat 4 and through a central passage 12 in the bearing block 1. In addition, a cup-shaped enclosure 13 and the bearing seat 4 form a housing surrounding the bellows 5, the enclosure 13 being fixed to the other bearing seat 4. As a result, relative motions between the two bearing seats 3 and 4 will cause corresponding relative motions between the throttling plate 8 and the housing walls 4 and 13, respectively, so that, depending on the direction of these relative motions, the volumes of the two compartments 9 and 10 will vary in opposite directions.

Each of the two compartments 9 and 10 has an intake valve 14 and 15, respectively. In the illustrated embodiment, the valves 14 and 15 are in the form of a flap valve integrated with the bellows, permitting intake of air but preventing expulsion of air from the bellows. This insures that the relative motions between the throttling plate 8 and the bearing seat 4 will cause a pumping action, since the compartment 9 or 10 in which the volume is increasing will take in air through the intake valve associated with it, while the intake valve in the other compartment is kept closed by the temporarily higher pressure in that compartment. The cushioning action of the air spring is then determined by the flow rate of air through the throttle apertures 7 and the compressibility of the air in the bellows.

Partially surrounding the bearing block 1 is a collar 16 which acts as a stop to stabilize the bearing block laterally during compression.

The invention thus provides a cushion bearing with an air spring which is inflated by the pumping action of the bearing seats and which therefore has no need for any external gas supply. Furthermore, the material of the resilient bellows forming the air chamber is mechanically supported by a rigid housing enclosing it.

Although the invention has been described herein with reference to a specific embodiment, many modifications and variations therein will readily occur to those skilled in the art. Accordingly, all such variations and modifications are included within the intended scope of the invention.

We claim:

1. A cushion bearing comprising two rigid bearing seats, a bearing block of resilient material and a double-acting gas spring acting in parallel with respect to the two rigid bearing seats, the gas spring comprising a resilient bellows encompassing a gas chamber, a rigid throttling member dynamically connected with one of the bearing seats and arranged to divide the gas chamber into two compartments whose volumes vary in opposite directions in response to relative motions of the bearing seats, means forming a rigid housing, which is separate from and encloses the resilient bellows, dynamically connected to the other bearing seat and acting on the bellows, and at least one intake valve for the bellows permitting entry of ambient air therein during relative movement between the bearing seats.

2. A bearing according to claim 1 wherein the throttling member comprises a throttling plate separating the bellows gas chamber into two toroidal compartments and provided with at least one throttling aperture connecting the compartments and including a central rod connected to the throttling member and to the one bearing seat.

3. A bearing according to claim 2 including at least one intake valve associated with each compartment.

4. A cushion bearing comprising two rigid bearing seats, a bearing block of resilient material and a double-acting gas spring acting in parallel with respect to the two rigid bearing seats, the gas spring comprising a resilient bellows forming a gas chamber, a rigid throttling member dynamically connected with one of the bearing seats and arranged to divide the gas chamber into two compartments whose volumes vary in opposite directions in response to relative motions of the bearing seats, means forming a rigid housing dynamically connected to the other bearing seat and acting on the bellows, and at least one intake valve for the bellows permitting entry of ambient air therein during relative movement between the bearing seats, wherein the throttling member comprises a throttling plate separating the bellows gas chamber into two toroidal compartments and provided with at least one throttling aperture connecting the compartments and including a central rod connected to the throttling member and to the one bearing seat and wherein the bearing block and the gas spring are located on opposed sides of the other bearing seat and the one bearing seat acts on a portion of the bearing block spaced from the other bearing seat and the bearing block has a passage to accommodate the central rod.

5. A bearing according to claim 1 including a collar provided on at least one of the bearing seats to form a stop limiting transverse deformation of the bearing block.

* * * * *